United States Patent [19]

Coran et al.

[11] 4,226,953

[45] Oct. 7, 1980

[54] THERMOPLASTIC COMPOSITIONS OF STYRENE-ACRYLONITRILE RESIN AND NITRILE RUBBER

[75] Inventors: Aubert Y. Coran; Raman P. Patel, both of Akron, Ohio

[73] Assignee: Monsanto Company, St. Louis, Mo.

[21] Appl. No.: 13,946

[22] Filed: Feb. 22, 1979

Related U.S. Application Data

[63] Continuation of Ser. No. 893,880, Apr. 6, 1978, abandoned.

[51] Int. Cl.$^2$ .................. C08L 9/02; C08L 25/12
[52] U.S. Cl. .................. 525/193; 204/159.14; 525/203; 525/204; 525/234

[58] Field of Search .............. 260/893, 887; 525/193, 525/234, 204, 203

[56] References Cited

U.S. PATENT DOCUMENTS

| 2,550,139 | 4/1951 | Daly | 260/893 |
| 2,698,313 | 12/1954 | Daly | 260/893 |

*Primary Examiner*—J. Ziegler
*Attorney, Agent, or Firm*—Larry R. Swaney

[57] ABSTRACT

Thermoplastic compositions are described comprising blends of styrene-acrylonitrile resin and nitrile rubber of high gel content.

10 Claims, No Drawings

THERMOPLASTIC COMPOSITIONS OF STYRENE-ACRYLONITRILE RESIN AND NITRILE RUBBER

This is a continuation of application Ser. No. 893,880 filed Apr. 6, 1978, now abandoned.

This application relates to thermoplastic compositions comprising blends of styrene-acrylonitrile resin (hereinafter called SAN resin) and nitrile rubber, and, especially, such blends in which the nitrile rubber has a high gel content.

BACKGROUND OF THE INVENTION

Modification of the impact resistance of SAN resins by the addition of nitrile rubber is common practice. The softening point of the blends can be increased by curing the rubber component to a soft vulcanized state, U.S. Pat. No. 2,439,202. If the rubber is vulcanized to a higher state of cure, the composition becomes a thermoset no longer processable as a thermoplastic. It is known that surface roughness of SAN resin-nitrile rubber blends could be overcome by building up the toluene-insoluble gel content of the nitrile rubber to at least 30% and less than 50% prior to incorporation in the SAN resin, U.S. Pat. No. 2,550,139. Also known are blends exhibiting improved processing characteristics comprising 50% or more SAN resin and a mixture of rubbers consisting of saturated acrylate rubber and nitrile rubber with a gel content within the range of 50% to 80%, U.S. Pat. No. 2,698,313. Curing of such three component blends improves the impact strength of the composition but gives thermosets no longer processable as thermoplastics. The prior art compositions containing nitrile rubber of high gel content are relatively inextensible which makes them unsuitable for applications where parts are subject to severe deformation.

SUMMARY OF THE INVENTION

Thermoplastic compositions of this invention comprise blends of thermoplastic SAN resin and nitrile rubber with a toluene insoluble gel content of at least 85%, preferably, of 90% or more. They are extensible compositions processable as thermoplastics and have improved toughness as compared to blends of similar composition but in which the gel content of the nitrile rubber is lower, such as, 80% or less. The compositions of the invention are characterized by high extensibility and toughness exhibiting elongations at break of at least 100% and toughness as measured by true stress at break of at least 300 Kg./cm². Preferred compositions of the invention exhibit elongations at break of 150% or more and true stress at break of 400 Kg./cm² or more. More preferred compositions of the invention are elastoplastic, i.e., they exhibit rubber-like elasticity yet are processable as thermoplastics.

The blends of the invention comprise gelled nitrile rubber particles dispersed throughout a SAN resin matrix. Properties are dependent upon gel content, dispersion and the size of the nitrile rubber particles in the blend. The gel content of the nitrile rubber may be advanced to the appropriate level by masticating the rubber at elevated temperature; however, preferably, and with certain nitrile rubbers by necessity, a high gel content nitrile rubber can only be obtained by use of rubber curatives. Unlike static cured blends in which the cured rubber is present as a continuous network throughout the part resulting in a composition which is unprocessable as thermoplastic, the compositions of this invention comprise of a blend in which the cured rubber is present in the form of small dispersed particles which permit processing the blend as a thermoplastic. Small particles and good dispersion improve the processability and the mechanical properties of the blend. Generally, the nitrile rubber particle size is 50 microns number average or less, preferably below 10 microns number average and more preferably, below 5 microns number average. It is also preferred that the weight average particle size be less than 50 microns and more preferred that no particles be larger than 50 microns and still more preferred that essentially all of the rubber particles are less than 20 microns in size.

Blends of the invention contain sufficient thermoplastic SAN resin to impart thermoplasticity and sufficient gelled nitrile rubber to impart rubberlike properties such as toughness and extensibility. Blends containing insufficient amounts of SAN resin are incoherent compositions resembling scorched rubber which blends are not processable as thermoplastics, whereas, blends containing insufficient amounts of gelled nitrile rubber are not tough and extensible; they are not rubberlike. The relative proportions of SAN resin and nitrile rubber necessary to provide sufficient nitrile rubber to give tough extensible compositions and necessary to provide sufficient SAN resin to give thermoplastic compositions cannot be defined with precision because the limits vary depending upon a number of factors, such as, the type of SAN resin or nitrile rubber, rubber particle size, the presence or absence of other ingredients (such as fillers and plasticizers, extenders, etc.), and the rubber gel content. For example, inert fillers such as carbon black or silica tend to reduce the operative range, whereas, plasticizers tend to increase the range of operative proportions. Plasticized nitrile rubber can be used in place of neat rubber to obtain elastoplastic compositions of the invention in which the relative proportion of SAN resin to nitrile rubber exceeds the relative proportion necessary to obtain elastoplastic compositions containing only SAN resin and nitrile rubber and no plasticizer. Also, blends containing highly cross-linked rubber require more SAN resin to maintain thermoplasticity than blends in which the rubber is cross-linked to a lesser extent. However, the relative proportion of SAN resin and nitrile rubber in any composition necessary to obtain the advantages of the invention is readily determined by preparing blends as hereinafter described and by observation of the properties and processibility of the resulting composition.

In general, a thermoplastic composition of the invention comprises a blend of about 25 to about 65 parts by weight thermoplastic SAN resin, and correspondingly about 75 to about 35 parts by weight of nitrile rubber, per 100 parts by weight of the resin and rubber combined, the rubber being at least 85% insoluble in toluene at room temperature. Elastoplastic compositions of the invention comprise a blend of about 25 to about 40 parts by weight thermoplastic SAN resin and about 75 to about 60 parts by weight of nitrile rubber per 100 parts by weight of the resin and rubber combined. More preferred compositions are blends exhibiting high strength and extensibility comprising about 30 to about 50 parts by weight SAN resin, preferably, containing less than 50 weight percent acrylonitrile, and about 70 to about 50 parts by weight cross-linked nitrile rubber, preferably, containing between 30–55 weight percent acrylonitrile, per 100 parts by weight of the resin and rubber combined, the rubber being at least 90% insoluble in toluene.

To obtain the compositions of the invention, it is essential that the nitrile rubber is cross-linked to the extent that its toluene insoluble gel content is at least 85 percent, and preferably, the rubber is cross-linked to the extent that its gel content is at least 90%. Failure to adequately cross-link the rubber gives thermoplastic but inadequately extensible or weak compositions. Elastomeric materials generally can be stretched at least 100%. Generally, the extensibility of the composition is enhanced with higher proportions of nitrile rubber and with increasing gel content of the rubber. Surprisingly, the compositions of the invention are processable as thermoplastics although the rubber is cross-linked to a point where it is at least 85 percent, preferably, 90% or more, insoluble in toluene at room temperature. Thermoplasticity is retained even when the rubber is cross-linked to the extent that it is almost completely toluene insoluble (gel content greater than 95%). As indicated above, the blends of the invention are envisaged as comprising microsized particles of cross-linked rubber dispersed throughout the SAN resin. This can account for the thermoplasticity.

In one embodiment of the invention, the rubber is cured by use of rubber curatives. A measure of the extent of cure is equilibrium solvent swelling of the cured rubber. The greater the extent of swelling, the less is the cross-link density or extent of cure. The rubber of the blend of the invention, when cured alone (in the absence of SAN resin but under the conditions of time, temperature and curative loading of the blended rubber) is cured to the extent that when swollen by dichloromethane at room temperature for 48 hours, it imbibes no more solvent than 16 times its dry weight of dichloromethane, preferably less than 10 times or more preferably less than 7 times its dry weight of dichloromethane. It should be noted that an over cure can occur in which properties will be somewhat inferior to the optimum case.

Vulcanizable rubbers (without the thermoplastic resin), although thermoplastic in the unvulcanized state, are normally classified as thermosets because they undergo the process of thermosetting after which they are no longer processable as thermoplastics. The products of the instant invention, although processable and reprocessable as thermoplastics, are prepared from blends of nitrile rubber and SAN resin which are treated under time and temperature conditions to cross-link the rubber or are treated with curatives in amounts and under time and temperature conditions known to give cured rubber products from static cures of the rubber in molds and, indeed, the rubber of the blend has undergone gelation to the extent characteristic of rubber cured in molds. Thermosets can be avoided in compositions of the invention by simultaneously masticating and curing the rubber in blends of rubber and molten resin. For example, the SAN resin and nitrile rubber are mixed using conventional masticating equipment, such as Banbury mixer, Brabender mixer, or a mixing extruder, at a temperature sufficient to soften the resin or more commonly, above the minimum processing temperature of the resin. After the SAN resin and nitrile rubber are intimately mixed, curative is added. Heating and masticating the molten mass at the vulcanization temperature usually completes the cross-link formation in a few minutes or less, but if shorter times are desired, higher temperatures may be used. A suitable range of temperatures for cross-link formation is from about the minimum processing temperature of the SAN resin to the decomposition temperature of the rubber which range commonly is from about 125° C. to 270° C. with the temperatures varying somewhat depending upon the composition, the presence of antidegradants and the mixing time. Typically, the range is from about 160° C. to 250° C. A preferred range of temperatures is from about 180° C. to about 220° C. To obtain a thermoplastic composition, mixing should continue without interruption during vulcanization. If appreciable cross-linking is allowed after mixing has stopped, a thermoset unprocessable composition may be obtained. A few simple experiments within the skill of the art utilizing available rubbers and curatives will suffice to determine their applicability for the preparation of the improved products of this invention. For additional information on dynamic cross-linking processes, see Gessler and Haslett, U.S. Pat. No. 3,037,954.

Methods other than the dynamic vulcanization of nitrile rubber/SAN resin blends can be utilized to prepare compositions of the invention. For example, the rubber can be fully vulcanized, either dynamically or statically, in the absence of the resin, powdered, and mixed with the molten SAN resin. Provided that the cross-linked rubber particles are small, well dispersed and in an appropriate concentration, compositions within the invention are easily obtained by blending cross-linked rubber particles with molten SAN resin. Accordingly, the term "blend" herein means a mixture comprising well dispersed small particles of cross-linked rubber. A mixture which is outside of the invention because it contains poorly dispersed or too large rubber particles can be comminuted by cold milling (to reduce average rubber particle sizes to below about 50 microns). After sufficient comminution or pulverization, a composition of the invention is obtained. Frequently, the case of poor dispersion or too large rubber particles is obvious to the naked eye and observable in a molded sheet. This is especially true in the absence of pigments and fillers. In such a case, pulverization and remolding gives a sheet in which aggregates of rubber particles or large particles are not obvious or are far less obvious to the naked eye and mechanical properties are greatly improved.

Rubbers satisfactory for the practice of the invention comprise essentially random noncrystalline, rubbery copolymers of 1,3-butadiene or isoprene copolymerized with vinyl nitrile monomer, such as acrylonitrile or methacrylonitrile which rubber copolymers are commonly called and are referred to herein and in the claims as nitrile rubber. Commercially available nitrile rubbers suitable for the practice of the invention are described in Rubber World Blue Book, 1975 Edition, Materials and Compounding Ingredients for Rubber, pages 416–430. Copolymers of about 85–40% diene and about 15–60% acrylonitrile are suitable with copolymers containing 30–55 weight percent acrylonitrile being preferred. Commercially available nitrile rubbers have various amounts of toluene insoluble gel content but many do not have sufficiently high gel content for preparation of the blends of the invention. The gel content of certain nitrile rubbers, may be increased by masticating the rubber at elevated temperature for a time sufficient to achieve a toluene insoluble gel content of at least 85% or more. Typically, the rubber is masticated, either alone but preferably with SAN resin, at 120°–250° C., preferably, 150°–220° C., for times of 1–100 minutes. The time required is shorter at higher masticating temperatures. Mastication in the presence of air may also shorten the time necessary to achieve high gel contents. Other nitrile rubbers, especially, those containing stabilizers, cannot be practically gelled by high temperature mastication. These rubbers should be cured with rubber curatives in order to achieve the toluene insoluble gel content in accordance to this invention.

Suitable thermoplastic styrene-acrylonitrile resins (referred to herein and the claims as SAN resins) are high molecular weight solid products from the polymerization of mixtures of monomers comprising styrene and acrylonitrile. SAN resins are items of commerce readily prepared by known processes, for example, by emulsion polymerization as described in U.S. Pat. No. 2,140,048. The proportion of styrene monomer may vary from 30–85 weight percent, and, correspondingly, the proportion of acrylonitrile monomer may vary from 70–15 weight percent, however, resins containing 50 weight percent or more styrene monomer are preferred. SAN resins containing 20–40 weight percent acrylonitrile monomer are especially preferred.

The compositions of the invention are all processable in an internal mixer, to products which, upon transferring at temperatures above the softening or minimum processing temperature of the resin phase, to the rotating rolls of a rubber mill, form continuous sheets. The sheets are reprocessable in the internal mixer, after reaching temperatures above the softening or minimum processing temperatures of the resin phase. The material is again transformed to the plastic state but upon passing the molten product through the rolls of the rubber mill a continuous sheet again forms. In addition, a sheet of elastoplastic composition of this invention can be cut into pieces and compression molded to give a single smooth sheet with complete knitting or flow between the pieces. It is in the foregoing sense that "thermoplastic" will be herein understood. In addition, compositions of the invention are further processable to the extent that articles may be formed therefrom by extrusion or injection molding.

Where the determination of extractables is an appropriate measure of the state of cure, an improved elastoplastic composition is produced by cross-linking a blend to the extent that the composition contains no more than about fifteen percent by weight of the rubber extractable at room temperature by toluene, and preferably to the extent that the composition contains less than ten percent by weight of the rubber extractable and more preferably less than five percent by weight extractable. In general, the less the rubber is extractable the better are the properties, although, respectable properties are obtained with rubber extractables as high as fifteen percent. Gel content of the rubber is equal to 100 minus the weight percent of the extractable. The gel content determination takes into account the proportion of SAN resin soluble in toluene. Gel content reported as percent gel is determined by the procedure similar to that of U.S. Pat. No. 3,203,937. The amount of insoluble rubber is determined by soaking a weighed specimen in toluene or dichloromethane at room temperature for an extended period and weighing the dried residue. Suitable corrections based upon knowledge of the composition are made. Thus, corrected initial and final weights are obtained by subtracting from the initial weight, the weight of soluble components, other than the rubber, such as extender oils, plasticizers and portions of the SAN resin soluble in organic solvent. Any insoluble pigments, fillers, etc., including insoluble SAN resin, are subtracted from both the initial and final weights. Specimens about two mm thick are used for gel determinations.

The particular results obtained by the aforedescribed dynamic curing process are a function of the particular rubber curing system selected. Curatives and the curative systems conventionally used to vulcanize nitrile rubbers are used for preparing compositions of the invention. Curative or curative systems applicable for vulcanizing nitrile rubbers may be used in the practice of the invention, for example, peroxide, azide and sulfur-vulcanizing systems. The selection of any particular vulcanizing systems varies depending upon the nature of the SAN resin and the nitrile rubber. High energy radiation is also utilizable as a curative means.

Examples of suitable peroxide curatives are lauryl peroxide, benzoyl peroxide, lead peroxide, bis-2,4-dichlorobenzoyl peroxide, dicumyl peroxide, di-t-butyl-peroxide, 2,5-dimethyl-2,5-bis(t-butylperoxy)hexane, 1,1-bis(t-butylperoxy)-3,3,5-trimethyl cyclohexane, tris-1,1-bis(t-butylperoxy)-3,3,5-trimethyl cyclohexane, tris-$\alpha,\alpha$-dimethyl-$\alpha$(t-butylperoxy)-methyl benzene, $\alpha,\alpha$-bis(butylperoxy)diisopropyl benzene, bis-(4-t-butylcyclohexyl)peroxydicarbonate, n-butyl-4,4-bis(t-butylperoxy)valerate and t-butyl perbenzoate. Examples of suitable polyfunctional cross-linking agents which may be used are dibenzo-p-quinonedioxime, p-quinonedioxime, m-phenylene bismaleimide, triallyl cyanurate, ethylene glycol dimethacrylate, pentaerythritol triacrylate, trimethylol propane triacrylate, tetraethylene glycol dimethacrylate, and neopentylglycol diacrylate. Additional examples of acrylate cross-linking agents are listed in the 1975 Rubber World Blue Book on page 398.

The amount of curative varies depending upon the type of curative and the composition of the blend. Enough curative must be used to cross-link the rubber while avoiding excessive quantities of curatives beyond the amount necessary to fully cure the rubber which can result in diminution of properties.

Thermoplastic compositions of the invention may be modified, either before or after vulcanization, by addition of ingredients which are conventional in the compounding of nitrile rubber, SAN resin and blends thereof. Examples of such ingredients include carbon black, silica, titanium dioxide, colored pigments, clay, zinc oxide, stearic acid, stabilizers, antidegradants, processing aids, adhesives, tackifiers, rubber plasticizers, wax, discontinuous fibers such as wood cellulose fibers and extender oils. The addition of carbon black, rubber plasticizer or both, preferably prior to dynamic vulcanization, are particularly recommended. Preferably, the carbon black and/or rubber plasticizer is masterbatched with the rubber and the masterbatch is mixed with the SAN resin. Carbon black improves the tensile strength and rubber plasticizer can improve the fabricability, heat stability, hysteresis, cost and permanent set of the elastoplastic compositions. Typical additions of carbon black comprise about 20–100 parts by weight of carbon black per 100 parts by weight of rubber and usually about 25–60 parts by weight carbon black per 100 parts by weight of rubber and plasticizer combined. The amount of carbon black which can be used depends, at least in part, upon the type of black and the amount of plasticizer present.

The compositions of the invention are useful for making a variety of articles such as tires, hoses, belts, gaskets, moldings and molded parts. They are particularly useful for making articles by extrusion, injection molding calendering and compression molding. Compositions of the invention also are useful for blending with thermoplastics, in particular, SAN resins. The compositions of the invention are blended with thermoplastics using conventional mixing equipment. The properties of the blend depend upon the proportions. Generally, the amount is such that the blend contains sufficient cross-linked rubber to obtain the desired effect.

The stress-strain properties of the compositions are determined in accordance with the test procedures set forth in ASTM D638 and ASTM D1566. True stress at break is the product of the ultimate tensile strength times the ultimate extension ratio. An approximate index of toughness is calculated by an abbreviated Griffith equation $(TS)^2/E$ (TS=tensile strength, E=Young's modulus). For a detailed analysis, refer to Fracture, edited by H. Liebowitz, published by Academic Press, New York, 1972, Ch. 6, Fracture of Elastomers by A. N. Gent. The term "elastomeric" as used herein and the claims refers to a composition which possesses the property of retracting within ten minutes to less than 160% of its original length after being stretched at room temperature to twice its length and held for ten minutes before release. Especially preferred compositions of the invention are rubbery compositions having tension set values of about 50% or less (retracting to 150% or less of its original length). Such compositions approximate the definition for rubber as in the ASTM Standards, V. 28, p. 756 (D1566). More preferred compositions are rubbery compositions having a Shore D hardness of 60 or below or a 100% modulus of 250 Kg./cm$^2$ or less or a Young's modulus below 4000 Kg./cm$^2$.

DESCRIPTION OF PREFERRED EMBODIMENTS

To illustrate the invention, SAN resin, nitrile rubber and antidegradant are mixed in the indicated proportions (parts by weight) at 80 rpm in a Brabender mixer at 180° C. oil bath temperature. After about 3 minutes the SAN resin is molten and a uniform blend is obtained. Curative(s) is then added and mixing is continued until a maximum Brabender consistency is reached (about 4–5 minutes), and mixing is continued for 2 minutes thereafter. The composition is removed, sheeted, returned to the Brabender mixer and mixed an additional two minutes. The composition is sheeted in a cold press and then compression molded at 220° C. and cooled below 100° C. under pressure before being removed. Properties of the molded sheet are measured and recorded. The SAN resin is a molding grade resin having a melt index of 15, (230° C.), sp.g. 0.98 and an acrylonitrile content of about 32% which resin is 2.1 weight % soluble in toluene and 99.5 weight percent soluble in dichloromethane at room temperature. The nitrile rubber is a copolymer of 1,3-butadiene and acrylonitrile. In Table 1, nitrile rubber containing about 33% acrylonitrile having a Mooney Viscosity of 80 is used. Stocks 1–4 contain a nitrile rubber in which the gel content is not advanced sufficiently (<85%) without curatives under the mixing conditions (180° C. for a total of about 10 minutes). This rubber can be purchased under the trade name Hycar ® 1032-80. Stocks 5–8 contain a rubber in which the gel content is advanced under the aforesaid conditions to 89% gel content. This nitrile rubber can be purchased under the trade name of Hycar ® 1092-80. Flectol ® H, a polymer antioxidant, is the trade name for polymerized 1,2-dihydro-2,2,4-trimethylquinoline. The insolubles and extractables as percent of rubber are determined by soaking specimens in toluene at room temperature for 48–96 hours, removing the specimen and drying to constant weight. Percent insoluble is calculated by dividing the weight of the toluene extracted specimen by its original weight and multiplying by 100. Extractables as percent of the rubber is calculated by dividing the weight of the material soluble in toluene (corrected for the fraction of SAN resin separately determined to be soluble in solvent) by the weight of the rubber in the original specimen and multiplying by 100. Rubber gel content (as percent) is 100 minus the percent of rubber extractable. Extractables as percent of the rubber is also determined in a similar manner by measuring the amount of material soluble in dichloromethane. The data are shown in Table 1. The cross-link density $\gamma/2$ is determined from equilibrium swelling measurements of the cured rubber alone (Flory-Rehner Equation).

TABLE 1

|  | 1 | 2 | 3 | 4 | 5 | 6 | 7 | 8 |
|---|---|---|---|---|---|---|---|---|
| Hycar 1032-80 | 60 | 60 | 60 | 60 | — | — | — | — |
| Hycar-1092-80 | — | — | — | — | 60 | 60 | 60 | 60 |
| SAN resin (32% AN) | 40 | 40 | 40 | 40 | 40 | 40 | 40 | 40 |
| Flectol ®H antidegradant | 0.6 | 0.6 | 0.6 | 0.6 | 0.6 | 0.6 | 0.6 | 0.6 |
| Sulfur curative[1] | — | 5.58 | — | — | — | 5.58 | — | — |
| 2,5-dimethyl-2,5-bis(t-butyl-peroxy)hexane | — | — | 0.75 | 0.75 | — | — | 0.75 | 0.75 |
| Trimethylolpropane triacrylate | — | — | — | 1.2 | — | — | — | 1.2 |
| UTS, Kg./cm$^2$ | 71 | 152 | 243 | 249 | 153 | 209 | 253 | 266 |
| M$_{100}$, Kg./cm$^2$ | — | 141 | 185 | 195 | 149 | 176 | 199 | 210 |
| E, Kg./cm$^2$ | 1079 | 1285 | 1138 | 1371 | 1588 | 1741 | 1774 | 1228 |
| UE, % | 50 | 155 | 180 | 170 | 120 | 160 | 180 | 160 |
| TSB, Kg./cm$^2$ | 107 | 388 | 680 | 662 | 335 | 543 | 711 | 697 |
| (UTS)$^2$/E, Kg./cm$^2$ | 5 | 18 | 52 | 45 | 15 | 25 | 36 | 58 |
| Tension set, % | — | — | — | — | 69 | 59 | 63 | 60 |
| Hardness, Shore D | 42 | 49 | 52 | 53 | 38 | 43 | 43 | 42 |
| ASTM #3 oil swell, % (70 hrs. @121° C.) | 18 | 16 | 14 | 14 | 15 | 17 | 15 | 14 |
| $\nu/2 \times 10^5$ mole/ml | 0.2 | 7.3 | 29 | 29 | — | 7.3 | 23 | 33 |
| Toluene solubility, wt. % |  |  |  |  |  |  |  |  |
| blend | 28 | 9.7 | 4.7 | 4.6 | 7.7 | 9.3 | 5.8 | 5.5 |
| rubber | 45 | 14 | 6.4 | 6.2 | 11 | 14 | 8.2 | 7.7 |
| Rubber gel content, % | 55 | 86 | 93.6 | 93.8 | 89 | 86 | 91.8 | 92.3 |
| Dichloromethane solubility, wt. % |  |  |  |  |  |  |  |  |
| blend | 78 | 53 | 42 | 44 | 49 | 47 | 42 | 40 |

TABLE 1-continued

| | 1 | 2 | 3 | 4 | 5 | 6 | 7 | 8 |
|---|---|---|---|---|---|---|---|---|
| rubber | 64 | 26 | 4.7 | 8.1 | 16 | 15 | 4.8 | 2.1 |

[1]3 parts ZnO, 1 part stearic acid, 2 parts bis(2-benzothiazolyl)-disulfide (MBTS), 1 part tetramethylthiuram disulfide (TMTD) and 0.3 parts sulfur.

Referring to Table 1, Stock 1 is a control containing nitrile rubber of low gel content. Stocks 2–8 illustrate compositions of the invention comprising blends of SAN resin and nitrile rubber of high gel content. Stocks 2–4 and 6–8 illustrate compositions in which the nitrile rubber is cross-linked with different cross-linking agents. Stocks 2 and 6 illustrate sulfur curative system, stocks 3 and 7 illustrate an organic peroxide curative, and stocks 4 and 8 illustrate a curative system comprising organic peroxide and acrylate co-agent. Stock 5 illustrates a composition of the invention in which the nitrile rubber has a high gel content without the use of curatives. All of the compositions are processable as thermoplastics. The data show that cross-linking the nitrile rubber results in a substantial improvement in tensile strength, ultimate elongation (UE), true stress at break and toughness. The data also show the aforesaid improvements in properties is directly related to gel content of the rubber or to the cross-link density of the rubber (determined in the rubber alone with the indicated amounts of curatives).

The effect of the relative proportion of SAN resin and nitrile rubber is shown in Table 2. The blends are prepared by the procedure of Table 1. The SAN resin, organic peroxide and acrylate co-agent are the same as in Table 1 and the nitrile rubber is the same as used in stocks 1–4 of Table 1. All compositions contain 1 part by weight Flectol ® H antidegradant. Samples designated A are controls without curatives; Samples designated B contain curative. Sample numbers 5B–5F contain various amounts of curatives and show the effect of the extent of cure. The data show that when the proportion of nitrile rubber is from 35 to 70 parts by weight, the effect of cross-linking the rubber is dramatic and results in substantial increase in tensile strength, true stress at break, toughness and elongation. When the proportion of nitrile rubber increases above 60 parts by weight per 100 total resin and rubber, elastomeric compositions are obtained. The data further show that the presence of rubber curatives results in a substantial increase in gel content (reduction of toluene extractable rubber). Sample numbers 5B–5F show that the gel content and the properties of the compositions can be varied by varying the curative level. Compositions containing 80 parts or more nitrile rubber (Samples 1 through 3) are outside the invention because of the lack of thermoplasticity; moldings are unsatisfactory exhibiting extremely rough surfaces and high elastic memory, i.e., the samples do not retain the shape of the mold but substantially distort from the mold dimensions. Compositions containing 30 parts or less nitrile rubber (Samples 10–13) are outside of the invention because of the low elongations, high modulus and minimal improvements in tensile strength due to curing the rubber.

TABLE 2

| Sample No. | SAN Resin, parts | Nitrile Rubber, parts | Acrylate Co-agent | Organic Peroxide, parts | UTS, Kg./cm² | M100, Kg./cm² | E, Kg./cm² | UE, % | TSB Kg./cm² | (UTS)²/E Kg./cm² |
|---|---|---|---|---|---|---|---|---|---|---|
| 1A | 10 | 90 | — | — | 17 | 12 | 13 | 280 | 65 | 22 |
| 1B | 10 | 90 | 0.45 | 0.2812 | 49 | 23 | 20 | 220 | 157 | 120 |
| 2A | 15 | 85 | — | — | 25 | 18 | 26 | 250 | 89 | 24 |
| 2B | 15 | 85 | 0.45 | 0.17 | 46 | 37 | 53 | 200 | 138 | 40 |
| 3A | 20 | 80 | — | — | 33 | 30 | 52 | 180 | 92 | 21 |
| 3B | 20 | 80 | 0.4 | 0.25 | 79 | 56 | 110 | 160 | 209 | 57 |
| 4A | 30 | 70 | — | — | 61 | 60 | 380 | 110 | 129 | 10 |
| 4B | 30 | 70 | 0.35 | 0.2188 | 143 | 102 | 354 | 160 | 372 | 58 |
| 5A | 35 | 65 | — | — | 71 | — | 759 | 60 | 112 | 7 |
| 5B | 35 | 65 | 0.325 | 0.2031 | 131 | 115 | 679 | 150 | 324 | 25 |
| 5C | 35 | 65 | 0.325 | 0.8125 | 222 | 156 | 667 | 180 | 617 | 74 |
| 5D | 35 | 65 | 0.65 | 0.4063 | 194 | 142 | 660 | 180 | 541 | 57 |
| 5E | 35 | 65 | 1.3 | 0.2031 | 162 | 134 | 636 | 150 | 407 | 41 |
| 5F | 35 | 65 | 1.3 | 0.8125 | 244 | 183 | 980 | 160 | 644 | 61 |
| 6A | 40 | 60 | — | — | 87 | — | 1445 | 40 | 124 | 5 |
| 6B | 40 | 60 | 1.2 | 0.75 | 264 | 209 | 1896 | 165 | 700 | 37 |
| 7A | 45 | 55 | — | — | 94 | — | 2571 | 20 | 116 | 3 |
| 7B | 45 | 55 | 1.1 | 0.6875 | 269 | 231 | 4038 | 150 | 683 | 18 |
| 8A | 50 | 50 | — | — | 134 | — | 4410 | 20 | 161 | 4 |
| 8B | 50 | 50 | 1.0 | 0.625 | 260 | 230 | 4171 | 160 | 676 | 16 |
| 9A | 65 | 35 | — | — | 218 | — | 9139 | 7 | 233 | 5 |
| 9B | 65 | 35 | 0.7 | 0.4375 | 298 | 298 | 8736 | 110 | 614 | 10 |
| 10A | 70 | 30 | — | — | 316 | — | 9539 | 10 | 347 | 11 |
| 10B | 70 | 30 | 0.6 | 0.375 | 309 | — | 8678 | 72 | 531 | 11 |
| 11A | 75 | 25 | — | — | 366 | — | 10222 | 8 | 395 | 13 |
| 11B | 75 | 25 | 0.5 | 0.3125 | 328 | — | 10513 | 70 | 558 | 10 |
| 12A | 80 | 20 | — | — | 347 | — | 18550 | 5 | 364 | 6 |
| 12B | 80 | 20 | 0.4 | 0.25 | 398 | — | 16626 | 50 | 585 | 10 |
| 13A | 90 | 10 | — | — | 522 | — | 15074 | 5 | 548 | 18 |
| 13B | 90 | 10 | 0.2 | 0.125 | 523 | — | 17345 | 8 | 565 | 16 |

| Sample No. | Shore A/D | Tension Set, % | ASTM #3 Oil Swell, %, 70 hours @ 121° C. | Solubility, Wt. % toluene blend | Solubility, Wt. % toluene rubber | Solubility, Wt. % dichloromethane blend | Solubility, Wt. % dichloromethane rubber | Cross-link density $\nu/2 \times 10^5$ mole/ml. |
|---|---|---|---|---|---|---|---|---|
| 1A | 46/9 | 18 | 27 | 39 | 44 | 71 | 68 | 0.2 |
| 1B | 54/12 | 4 | 28 | 14 | 15 | 27 | 20 | 9.7 |
| 2A | 55/12 | 25 | 28 | 36 | 42 | 74 | 69 | 0.2 |

TABLE 2-continued

| | | | | | | | | |
|---|---|---|---|---|---|---|---|---|
| 2B | 68/21 | 8 | 28 | 16 | 18 | 32 | 20 | 6.9 |
| 3A | 69/18 | 33 | 26 | 36 | 45 | 70 | 63 | 0.2 |
| 3B | 79/30 | 12 | 23 | 12 | 14 | 34 | 18 | 9.7 |
| 4A | 89/35 | — | 20 | 39 | 41 | 69 | 56 | 0.2 |
| 4B | 89/40 | 31 | 19 | 8.2 | 11 | 36 | 10 | 9.7 |
| 5A | 90/36 | — | 19 | 29 | 44 | 73 | 59 | 0.2 |
| 5B | 92/43 | 53 | 17 | 11 | 17 | 47 | 19 | 9.7 |
| 5C | 92/47 | 45 | 15 | 5.1 | 7.0 | 37 | 4.6 | 25.1 |
| 5D | 92/47 | 46 | 16 | 6.4 | 9.0 | 39 | 7.0 | 14.9 |
| 5E | 91/45 | 49 | 17 | 8.8 | 13 | 42 | 12 | 13.3 |
| 5F | 92/47 | 46 | 14 | 4.9 | 6.7 | 36 | 3.2 | 29.0 |
| 6A | 93/43 | — | 17 | 29 | 47 | 73 | 56 | 0.2 |
| 6B | 95/54 | 67 | 13 | 4.8 | 7.0 | 41 | 3.9 | 29.0 |
| 7A | 95/50 | — | 17 | 25 | 45 | 75 | 56 | 0.2 |
| 7B | 95/57 | 71 | 13 | 4.7 | 7.3 | 46 | 5.3 | 29.0 |
| 8A | 95/56 | — | 15 | 21 | 40 | 75 | 51 | 0.2 |
| 8B | 96/60 | 78 | 13 | 5.7 | 9.8 | 52 | 6.6 | 29.0 |
| 9A | 96/67 | — | 11 | 18 | 50 | 86 | 62 | 0.2 |
| 9B | 96/70 | — | 9 | 5.0 | 11 | 64 | 2.7 | 29.0 |
| 10A | —/72 | — | — | 9.9 | 29 | 90 | 69 | 0.2 |
| 10B | —/73 | — | — | 2.1 | 3.5 | 67 | 0 | 29.0 |
| 11A | —/73 | — | — | 9.1 | 31 | 89 | 61 | 0.2 |
| 11B | —/74 | — | — | 2.2 | 4.4 | 73 | 0.2 | 29.0 |
| 12A | 96/75 | — | 6 | 13 | 57 | 92 | 62 | 0.2 |
| 12B | 97/79 | — | 5 | 5.1 | 19 | 79 | 4.4 | 29.0 |
| 13A | 97/80 | — | — | 8.1 | 68 | 96 | 70 | 0.2 |
| 13B | 97/81 | — | — | 4.3 | 27 | 89 | 12 | 29.0 |

A study of the effect of the relative proportions of SAN resin and nitrile rubber using a sulfur curative system is shown in Table 3. The procedure and the SAN resin are the same as in Table 1. All compositions contain 1 part by weight Flectol H antidegradant. The nitrile rubber is the same as in stocks 5-8 of Table 1. Compositions of the invention illustrated by Samples 3-5 show that sulfur curatives increase tensile strength, elongation, true stress at break, and toughness. The greater amount of toluene extractables is probably indicative that part of the sulfur systems is soluble in toluene. Compositions containing 80 parts or more nitrile rubber (Samples 1 and 2) are not processable as thermoplastics and are outside of the invention.

weight Flectol H antidegradant. Samples designated A contain no curative. Samples designated B contain 0.65 parts by weight acrylate co-agent and 0.4063 parts by weight organic peroxide, both the same as used in Table 1. In Samples 1-8, the SAN resin is a molding grade resin having a melt index of 14 and an acrylonitrile content of about 32 percent which resin is 1.4 weight percent soluble in toluene and 99.2 weight percent soluble in dichloromethane at room temperature. In Samples 9 and 10, the SAN resin is an extrusion and injection molding grade resin having a Vicat Softening Point of 109° C., sp.g. 1.16 and an acrylonitrile content of 63 percent which resin is insoluble in toluene and 8.9 weight percent soluble in dichloromethane at room

TABLE 3

| Sample No. | SAN resin, parts | Nitrile Rubber, parts | Curative[a] parts | UTS, Kg./cm² | M100, Kg./cm² | E, Kg./cm² | UE, % | TSB, Kg./cm² | (UTS)²/E, Kg./cm² |
|---|---|---|---|---|---|---|---|---|---|
| 1A | 10 | 90 | — | 54 | 33 | 40 | 180 | 152 | 73 |
| 1B | 10 | 90 | 8.37 | 51 | 31 | 42 | 200 | 151 | 62 |
| 2A | 20 | 80 | — | 101 | 78 | 178 | 160 | 262 | 53 |
| 2B | 20 | 80 | 7.44 | 91 | 65 | 192 | 180 | 255 | 43 |
| 3A | 30 | 70 | — | 115 | 115 | 604 | 120 | 250 | 22 |
| 3B | 30 | 70 | 6.51 | 165 | 118 | 634 | 190 | 475 | 43 |
| 4A | 40 | 60 | — | 153 | 149 | 1558 | 120 | 335 | 15 |
| 4B | 40 | 60 | 5.58 | 209 | 176 | 1741 | 160 | 543 | 25 |
| 5A | 50 | 50 | — | 205 | — | 3885 | 90 | 394 | 11 |
| 5B | 50 | 50 | 4.65 | 233 | 215 | 3375 | 140 | 569 | 16 |

[a]The cure system contains 53.8 parts ZnO, 10.75 parts stearic acid, 21.5 parts MBTS, 10.75 parts TMTD and 3.2 parts sulfur.

| Sample No. | 10' Shore A/D | Ten.Set, % | ASTM #3 Oil Swell, % 70 hours @ 121° C. | Solubility, Wt. % toluene blend | toluene rubber | dichloromethane blend | dichloromethane rubber | Cross-link Density ν/2 × 10⁵ mole/ml. |
|---|---|---|---|---|---|---|---|---|
| 1A | 58/15 | 2 | 22 | 9.6 | 10 | 21 | 12 | — |
| 1B | 60/15 | 5 | 25 | 16 | 18 | 29 | 22 | 7.3 |
| 2A | 77/27 | 19 | 22 | 8.9 | 11 | 31 | 14 | — |
| 2B | 78/28 | 17 | 24 | 14 | 16 | 33 | 18 | 7.3 |
| 3A | 82/32 | 49 | 18 | 9.9 | 13 | 44 | 20 | — |
| 3B | 91/32 | 38 | 20 | 11 | 15 | 39 | 16 | 7.3 |
| 4A | 93/38 | 69 | 15 | 7.7 | 11 | 49 | 16 | — |
| 4B | 92/43 | 59 | 17 | 9.3 | 14 | 47 | 15 | 7.3 |
| 5A | 91/44 | 81 | 14 | 7.3 | 12 | 57 | 15 | — |
| 5B | 92/48 | 73 | 14 | 7.9 | 13 | 55 | 15 | 7.3 |

The effect of different nitrile rubbers is shown in Table 4. The blends contain 65 parts by weight nitrile rubber, 35 parts by weight SAN resin and 1 part by temperature. The blends are prepared by the procedure of the examples of Table 1. The data show, in Sample 1, containing low acrylonitrile content rubber and in Samples 2 and 3 containing low viscosity rubber, that more curative is needed to obtain a gel content of 85% or more. Samples 4-8 show that the curative level is adequate with rubber containing 33%-51% AN content and Mooney viscosities of 45-80 and that such rubbers give blends exhibiting superior physical properties.

Samples 7A and 8A are blends containing nitrile rubbers which develop high gel contents under processing and Samples 7B and 8B show that such blends are improved by the use of curatives to further increase the gel content of the rubber. Comparison of Samples 9 and 10 show that a blend containing a nitrile rubber of higher acrylonitrile content exhibits superior properties.

TABLE 4

| Sample No. | Nitrile Rubber % AN | M14'@100° C. | UTS, Kg./cm² | M100, Kg/cm² | E, Kg.cm² | UE, % | TSB, Kg.cm² | (UTS)²/E, Kg./cm² | Shore A/D | Tension Set, % |
|---|---|---|---|---|---|---|---|---|---|---|
| 1A | 22 | 70 | 38 | — | 277 | 60 | 60 | 5 | 88/30 | — |
| 1B | | | 80 | — | 653 | 70 | 136 | 10 | 92/40 | — |
| 2A | 33 | 25 | 11 | 17 | 65 | 300 | 44 | 2 | 82/25 | 64 |
| 2B | | | 110 | 107 | 721 | 120 | 238 | 17 | 91/41 | — |
| 3A | 33 | 25 | 28 | 33 | 144 | 170 | 75 | 5 | 83/28 | 66 |
| 3B | | | 117 | 86 | 534 | 190 | 344 | 26 | 90/40 | 31 |
| 4A | 33 | 50 | 44 | 44 | 249 | 100 | 88 | 8 | 85/30 | — |
| 4B | | | 157 | 138 | 660 | 130 | 367 | 37 | 90/45 | 48 |
| 5A | 33 | 80 | 57 | — | 493 | 60 | 91 | 7 | 90/38 | — |
| 5B | | | 206 | 153 | 645 | 175 | 567 | 66 | 92/48 | 46 |
| 6A | 41 | 60 | 58 | 74 | 560 | 180 | 161 | 6 | 92/40 | 85 |
| 6B | | | 214 | 144 | 878 | 230 | 704 | 52 | 94/48 | 59 |
| 7A | 45 | 60 | 153 | 92 | 732 | 500 | 910 | 32 | 96/55 | 64 |
| 7B | | | 196 | 149 | 1142 | 270 | 727 | 34 | 93/60 | 63 |
| 8A | 51 | 45 | 151 | 146 | 2126 | 250 | 533 | 11 | 96/60 | 84 |
| 8B | | | 208 | 191 | 2024 | 165 | 551 | 21 | 94/61 | 77 |
| 9A | 33 | 80 | 57 | — | 447 | 80 | 101 | 7 | 87/33 | — |
| 9B | | | 109 | — | 866 | 60 | 174 | 14 | 93/47 | — |
| 10A | 45 | 80 | 52 | 31 | 81 | 530 | 328 | 33 | 84/35 | — |
| 10B | | | 157 | 142 | 630 | 135 | 369 | 39 | 91/45 | 55 |

| Sample No. | ASTM #3 Oil Swell, % 70 hours @ 121° C. | Solubility, Wt. % toluene blend | toluene rubber | dichloromethane blend | dichloromethane rubber | Cross-Link Density, ν/2 × 10⁵ mole/ml. |
|---|---|---|---|---|---|---|
| 1A | 67 | 31 | 46 | 65 | 47 | — |
| 1B | 42 | 11 | 16 | 44 | 15 | 19.0 |
| 2A | 23 | 43 | 66 | 86 | 79 | — |
| 2B | 22 | 16 | 23 | 50 | 25 | 5.3 |
| 3A | 9.1 | 29 | 43 | 84 | 77 | — |
| 3B | 8.0 | 13 | 18 | 51 | 26 | 5.3 |
| 4A | 21 | 42 | 63 | 87 | 80 | — |
| 4B | 19 | 9.2 | 13 | 44 | 15 | 9.6 |
| 5A | 17 | 31 | 46 | 79 | 68 | 0.2 |
| 5B | 15 | 6.7 | 10 | 40 | 9.3 | 15.0 |
| 6A | 7.4 | 7.5 | 11 | 81 | 71 | — |
| 6B | 8.5 | 4.8 | 6.6 | 42 | 12 | 10.2 |
| 7A | 3.5 | 2.9 | 3.7 | 96 | 94 | — |
| 7B | 8.8 | 2.4 | 2.9 | 48 | 21 | 6.1 |
| 8A | 5.7 | 7.1 | 10 | 59 | 38 | — |
| 8B | 11 | 4.7 | 6.4 | 47 | 21 | 5.5 |
| 9A | 15.0 | 27 | 42 | 48 | 68 | — |
| 9B | 15.0 | 5.7 | 8.7 | 14 | 16 | 15.0 |
| 10A | 4.5 | 2.8 | 4.3 | 62 | 90 | — |
| 10B | 4.8 | 2.3 | 3.5 | 19 | 24 | 6.1 |

TABLE 5

| Sample No. | Acrylate co-agent, parts | Organic peroxide, parts | UTS, Kg./cm² | M100, Kg./cm² | E, Kg./cm² | UE, % | TSB Kg./cm² | (UTS)²/E, Kg./cm² |
|---|---|---|---|---|---|---|---|---|
| 1A | — | — | 97 | 97 | 762 | 110 | 203 | 12 |
| 1B | 0.65 | 0.4063 | 201 | 145 | 572 | 170 | 551 | 71 |
| 1C | 1.3 | 0.813 | 214 | 167 | 810 | 150 | 537 | 57 |
| 2A | — | — | 67 | — | 590 | 70 | 113 | 8 |
| 2B | 0.65 | 0.4063 | 214 | 153 | 637 | 170 | 582 | 72 |
| 2C | 1.3 | 0.813 | 224 | 170 | 509 | 140 | 544 | 99 |
| 3A | — | — | 57 | — | 493 | 60 | 91 | 7 |
| 3B | 0.65 | 0.4063 | 206 | 153 | 645 | 175 | 567 | 66 |
| 3C | 1.3 | 0.813 | 244 | 189 | 812 | 145 | 598 | 73 |
| 3D | 1.3* | 0.813 | 219 | 177 | 647 | 130 | 510 | 74 |
| 3E | 1.3** | 0.813 | 242 | 203 | 864 | 130 | 561 | 68 |

*1 part of tris nonylphenyl phosphite added after cure per 100 parts rubber.
**m-phenylene bismaleimide co-agent used instead of acrylate co-agent.

| Sample No. | Shore A/D | Tension Set,% | ASTM #3 Oil Swell, % 70 hours @ 121° C. | Solubility, Wt. % toluene blend | toluene rubber | dichloromethane blend | dichloromethane rubber | Cross-link Density, ν/2 × 10⁵ mole/ml. |
|---|---|---|---|---|---|---|---|---|
| 1A | 90/40 | bk. | 18 | 44 | 43 | 77 | 65 | 0.2 |

TABLE 5-continued

| | | | | | | | | |
|---|---|---|---|---|---|---|---|---|
| 1B | 92/51 | 42 | 15 | 25 | 14 | 40 | 8.6 | 14.9 |
| 1C | 93/50 | — | 18 | 25 | 14 | 36 | 3.4 | 29.0 |
| 2A | 88/37 | bk. | 18 | 30 | 45 | 79 | 68 | 0.2 |
| 2B | 91/52 | 44 | 15 | 6.1 | 8.2 | 40 | 8.2 | 14.9 |
| 2C | 90/45 | — | 14 | 4.6 | 5.9 | 33 | 0 | 29.0 |
| 3A | 90/38 | bk. | 17 | 31 | 46 | 79 | 68 | 0.2 |
| 3B | 92/48 | 46 | 15 | 6.7 | 9.5 | 40 | 9.3 | 14.9 |
| 3C | 92/50 | — | 13 | 4.3 | 5.8 | 36 | 3.4 | 29.0 |
| 3D | 92/52 | — | 13 | 4.9 | 6.7 | 37 | 4.7 | 29.0 |
| 3E | 93/53 | — | 12 | 4.5 | 6.9 | 36 | 5.1 | — |

A study of the effect of different SAN resins is shown in Table 5. The compositions contain 65 parts by weight nitrile rubber, 35 parts by weight SAN resin and 1 part by weight Flectol-H antidegradant. The procedure, organic peroxide and acrylate co-agent are the same as for the samples in Table 1. The nitrile rubber is the same as in stocks 1–4 of Table 1. The SAN resin of sample 1 is a molding grade resin having a melt index of 7, ultimate tensile strength of 721 Kg./cm$^2$, ultimate elongation of 2.8% and an acrylonitrile content of 23 percent which resin is 46.4 weight percent soluble in toluene and 99.2 soluble in dichloromethane at room temperature. The SAN resin of sample 2 is the same as in Table 2. The SAN resin of sample 3 is the same as in Stocks 1–8 of Table 4. All compositions are thermoplastic. Referring to Table 5, the data show that cross-linking the rubber with curatives results in substantial improvements in physical properties and in gel content of the rubber. The compositions containing cross-linked rubber are also elastomeric as indicated by the tension set values.

Elastomeric compositions of the invention can be made using ABS resin (as defined below) as a substitute for the SAN resin and a portion of the nitrile rubber. Thus, the acrylonitrile-styrene component of ABS resin is regarded as SAN resin and the polybutadiene component of ABS resin is regarded as a replacement for a minor portion of the nitrile rubber for purposes of this invention. Satisfactory ABS resins are acrylonitrile-polybutadiene-styrene copolymers prepared by blending styrene-acrylonitrile copolymer (SAN resins as described above) with polybutadiene rubber or by polymerizing styrene and acrylonitrile in the presence of polybutadiene rubber latex which sometimes results in grafting some of the SAN copolymer onto the rubber. Suitable proportions of styrene and acrylonitrile in ABS resins are the same as neat SAN resin which ABS resins may contain up to 30 wt. percent polybutadiene or more.

TABLE 6

ABS/NBR Compositions[a]

| Sample No. | ABS, Parts | NBR, Parts | Acrylate co-agent, Phr | Organic peroxide, Phr | UTS, Kg./cm$^2$ | M100, Kg./cm$^2$ | E, Kg./cm$^2$ | UE, % | TSB Kg./cm$^2$ |
|---|---|---|---|---|---|---|---|---|---|
| | 13% Bd. | | | | | | | | |
| 1A | 20 | 80 | — | — | 32 | 29 | 51 | 243 | 110 |
| 1B | 20 | 80 | 2 | 0.15 | 65 | 47 | 105 | 171 | 176 |
| 2A | 30 | 70 | — | — | 49 | 48 | 154 | 173 | 134 |
| 2B | 30 | 70 | 2 | 0.40 | 140 | 98 | 309 | 175 | 385 |
| 3A | 35 | 65 | — | — | 72 | 72 | 373 | 128 | 164 |
| 3B | 35 | 65 | 2 | 0.60 | 185 | 139 | 515 | 157 | 475 |
| | 24–27% Bd. | | | | | | | | |
| 4A | 30 | 70 | — | — | 35 | 27 | 84 | 230 | 116 |
| 4B | 30 | 70 | 2 | 0.40 | 132 | 100 | 305 | 151 | 331 |
| 5A | 40 | 60 | — | — | 65 | 62 | 240 | 136 | 153 |
| 5B | 40 | 60 | 2 | 0.60 | 139 | 99 | 285 | 164 | 367 |

| Sample No. | (UTS)$^2$/E, Kg./cm$^2$ | Shore A | Shore D | Tension Set | ASTM #3 Oil Swell,[b] % 70 hrs. @ 121° C. | Cross-link Density, ν/2 × 10$^5$ Mole/ml. | Solubility, Wt., % toluene blend | rubber |
|---|---|---|---|---|---|---|---|---|
| 1A | 20 | 68 | 20 | 31 | 25 | 0.2 | 30 | 36 |
| 1B | 40 | 79 | 30 | 13 | 22 | 7.7 | 13 | 16 |
| 2A | 16 | 81 | 25 | 59 | 25 | 0.2 | 27 | 37 |
| 2B | 63 | 90 | 42 | 26 | 20 | 16.3 | 8 | 9 |
| 3A | 14 | 86 | 26 | bk | 24 | 0.2 | 26 | 38 |
| 3B | 66 | 94 | 45 | 38 | 18 | 20.9 | 6 | 8 |
| 4A | 15 | 70 | 20 | 33 | 37 | 0.2 | 34 | 40 |
| 4B | 57 | 88 | 38 | 28 | 27 | 16.3 | 10 | 6 |
| 5A | 18 | 85 | 28 | 48 | 44 | 0.2 | 30 | 36 |
| 5B | 68 | 90 | 37 | 29 | 26 | 20.9 | 10 | 3 |

[a]All compositions contain 1 part Flectol H.
[b]The compositions without curatives were deformed in the oil @ 121° C.

Examples of satisfactory ABS resin/nitrile rubber blends are shown in Table 6. The compositions contain the indicated parts by weight nitrile rubber (same as stocks 1–4 of Table 1) and ABS resin. The ABS resin of Samples 1–3 contain 13% polybutadiene, 59% styrene and 28% acrylonitrile. The ABS resin of Samples 4 and 5 contain between 24–27% polybutadiene, 51% styrene and 22% acrylonitrile. The procedure, organic peroxide and acrylate co-agent are the same as for the Samples of Table 1. All compositions are thermoplastic. The data show that cross-linking the rubber with curatives substantially improves the physical properties and increases the gel content of the rubber.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A thermoplastic composition comprising a blend of about 20 to about 65 parts by weight thermoplastic SAN resin comprising a polymer of styrene and acrylonitrile and about 75 to about 35 parts by weight nitrile rubber comprising a polymer of 1,3-butadiene or isoprene and vinyl nitrile monomer per 100 total parts by weight SAN resin and nitrile rubber in which the nitrile rubber is cured with rubber curative and has a gel content in toluene of at least 85%.

2. The composition of claim 1 comprising a blend of about 30 to about 50 parts by weight SAN resin and about 70 to about 50 parts by weight of nitrile rubber having a gel content in toluene of at least 90%.

3. The composition of claim 2 having an elongation at break of at least 100%.

4. The composition of claim 3 in which the nitrile rubber is in the form of dispersed particles of a size of 50 microns number average or less.

5. The composition of claim 4 having an elongation at break of at least 150% and a true stress at break of at least 400 Kg./sq.cm.

6. An elastoplastic composition comprising a blend of about 25 to about 40 parts by weight SAN resin comprising a polymer of styrene and acrylonitrile and about 75 to about 60 parts by weight rubber comprising a polymer of 1,3-butadiene or isoprene and vinyl nitrile monomer per 100 total parts by weight SAN resin and nitrile rubber in which the nitrile rubber is cured with rubber curative and has a gel content in toluene of at least 85% which composition is elastomeric and processable as a thermoplastic.

7. The composition of claim 6 in which the nitrile rubber is cured with rubber curative comprising organic peroxide and acrylate co-agent.

8. The composition of claim 6 having an elongation at break of at least 150%.

9. The composition of claim 8 having a true stress at break of at least 300 Kg./sq.cm.

10. The composition of claim 9 in which the nitrile rubber has a gel content in toluene of at least 90%.

* * * * *